(12) United States Patent
Bourhis et al.

(10) Patent No.: US 11,643,967 B2
(45) Date of Patent: May 9, 2023

(54) NACELLE AIR INTAKE PROVIDED WITH A MIXED ICE PROTECTION SYSTEM

(71) Applicant: Airbus Operations SAS, Toulouse (FR)

(72) Inventors: Arnaud Bourhis, Toulouse (FR); Gregory Albet, Toulouse (FR); Alain Porte, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/684,667

(22) Filed: Mar. 2, 2022

(65) Prior Publication Data

US 2022/0282669 A1 Sep. 8, 2022

(30) Foreign Application Priority Data

Mar. 3, 2021 (FR) ...................................... 2102075

(51) Int. Cl.
*F02C 7/047* (2006.01)
*F02C 7/24* (2006.01)

(52) U.S. Cl.
CPC ................ *F02C 7/047* (2013.01); *F02C 7/24* (2013.01); *F05D 2260/96* (2013.01)

(58) Field of Classification Search
CPC .... F02C 7/047; F02C 7/24; F02C 6/06; F02C 7/045; F05D 2260/96; Y02T 50/60; B64D 15/163; B64D 15/02; B64D 2033/0206; B64D 2033/0233; B64D 33/02
See application file for complete search history.

(56) References Cited

U.S. PATENT DOCUMENTS

| 2009/0224104 | A1 | 9/2009 | Tenebre et al. | |
| 2010/0199629 | A1 | 8/2010 | Chene et al. | |
| 2010/0294882 | A1* | 11/2010 | Gantie | B64D 33/02 244/1 N |
| 2020/0070993 | A1* | 3/2020 | Porte | F02C 7/047 |
| 2020/0122843 | A1* | 4/2020 | Porte | B64D 33/02 |
| 2020/0122844 | A1 | 4/2020 | Porte et al. | |

FOREIGN PATENT DOCUMENTS

FR 3087419 A1 4/2020

OTHER PUBLICATIONS

French Search Report; priority document.

* cited by examiner

*Primary Examiner* — Jacob M Amick
*Assistant Examiner* — Charles J Brauch
(74) *Attorney, Agent, or Firm* — Greer, Burns & Crain, Ltd.

(57) ABSTRACT

An optimized protection against ice on the inner and outer faces of an aircraft engine nacelle air intake with the air intake including an outer face and an inner face meeting at a line at the longitudinally extreme, called extremum line, an acoustic panel being installed on the inner surface of a part of the inner face. An elimination system based on vibration of the ice formed is put in place on at least a part of the outer face and an ice formation prevention system using a hot fluid is put in place on at least a part of the inner face and either an ice elimination system or an ice formation prevention system using a hot fluid is installed on the inner face and on the outer face, a marking line marking the boundary between the two systems.

14 Claims, 7 Drawing Sheets

NACELLE AIR INTAKE PROVIDED WITH A MIXED ICE PROTECTION SYSTEM

CROSS-REFERENCES TO RELATED APPLICATIONS

This application claims the benefit of the French patent application No. 2102075 filed on Mar. 3, 2020, the entire disclosures of which are incorporated herein by way of reference.

FIELD OF THE INVENTION

The present invention relates to aircraft propulsive assemblies and more particularly the air intake of the nacelles of the propulsive assemblies.

BACKGROUND OF THE INVENTION

Conventionally, an aircraft nacelle comprises, from front to rear, a first section upstream in the direction of the aerodynamic flow passing through the nacelle of the aircraft in flight, called air intake, a second section which covers the casing of the engine fan, called fan cowl, and a third section which generally has a thrust reversing zone which surrounds the body of the turbine of the engine downstream in the direction of the aerodynamic flow.

The leading edges of the aircraft, and, in particular, the lips of the air intakes of the nacelles of the propulsive assemblies, can be subject to the formation of frost which, in building up, forms blocks of ice. Such blocks of ice can disrupt the flow in the air intake and alter the aerodynamic characteristics of the propulsive assembly. To mitigate this drawback, it is known practice to provide the air intake lip with a defrosting system.

Moreover, it is also known practice to provide the propulsive assembly with an acoustic attenuation panel, called acoustic panel. Such a panel makes it possible to reduce the sound effect produced by a turbine engine present in the propulsive assembly when it is operated. However, it is not possible to extend the acoustic panel towards the air intake lip in order to obtain a greater attenuation of the noise coming from the turbine engine without impacting the defrosting zone at the air intake lip.

Figure 1:
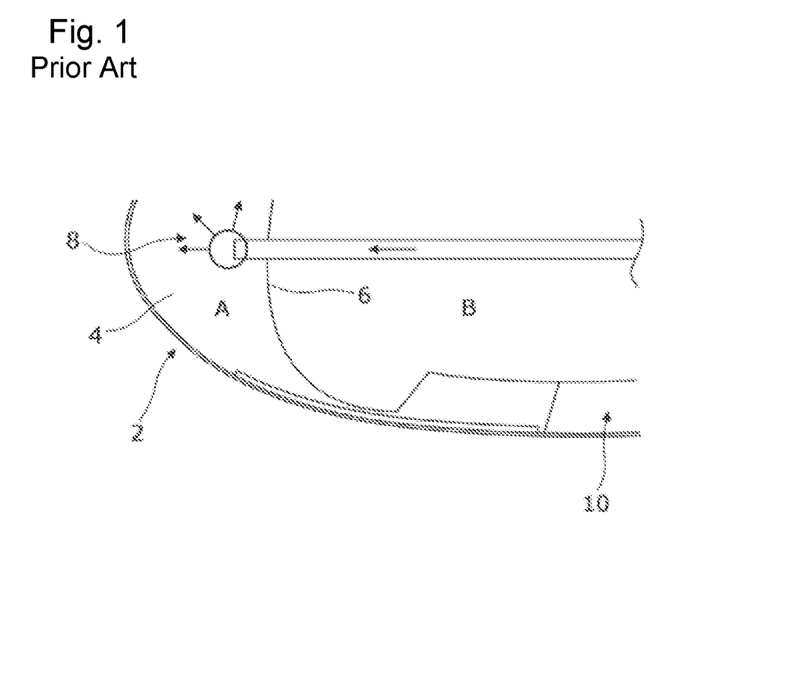
FIG. 1 is a simplified longitudinal cross-sectional view of an air intake according to the prior art.

The patent application FR3087419 shows an engine nacelle, represented in FIG. 1, comprising a lip 2 delimiting an annular space 4 closed by a front frame 6. This annular space constitutes the so-called defrosting zone A that is called D-duct. The annular space 4 is arranged to receive a supply of hot air 8 making it possible to prevent the formation of the ice. The so-called acoustic zone B making it possible to attenuate the noise of the engine is located downstream of the defrosting zone A, namely downstream of the annular space 4, i.e., downstream of the front frame 6; the inner wall of the nacelle in the zone B is equipped with an acoustic panel 10. The air 8 is heated to very high temperatures, generally 250° C. to 550° C. Now, to address the defrosting constraints, this annular space 4 is of large size and the temperatures are therefore difficult to make uniform which leads to thick and heavy parts. Furthermore, a large part of the inner surface is without any acoustic panel.

SUMMARY OF THE INVENTION

The present invention aims to propose a nacelle air intake offering an improvement to the ice protection system that makes it possible to extend the acoustic performance levels closer to the air intake in the annular space and to allow the defrosting of the outer face of the air intake whose form addresses natural laminar flow constraints.

To this end, the present invention relates to an air intake comprising an outer face and an inner face meeting at a line at the longitudinally extreme, called extremum line, an acoustic panel being installed on the inner surface of a part of the inner face, characterized in that an elimination system based on vibration of the ice formed is put in place on at least a part of the outer face and an ice formation prevention system using a hot fluid is put in place on at least a part of the inner face and in that either an ice elimination system or an ice formation prevention system using a hot fluid is installed on the inner face and on the outer face, a marking line marking the boundary between the two systems.

In this way, the systems are suitable for positioning in the air intake. Because of the placement of the ice elimination system at least on the outer face, the blocks of ice are driven by the air stream licking the outer face and are in practice not ingested by the engine which could worsen the performance levels thereof. In addition, by choosing an ice formation prevention system on the inner face, once again no block of ice can be ingested by the engine, the ice not being formed thereon.

The invention provides at least one of the following optional features, taken alone or in combination.

The marking line corresponds to the upstream end of the acoustic panel incorporating the ice formation prevention system.

The ice elimination system is put in place only on the outer face.

The ice elimination system is put in place to beyond the extremum line on the inner face.

The ice formation prevention system is put in place only on the inner face.

The ice formation prevention system is put in place to beyond the extremum line on the outer face.

The ice formation prevention system conducts hot air through ducts located on the inner face.

The formed ice elimination system comprises piezoelectric devices distributed over at least a part of the inner surface of the outer face.

Thermoelectric generators are placed on a hot surface of the air intake and connected to the piezoelectric devices to supply them from the temperature difference between the interior of the air intake and a hot surface inside the latter.

The ice formation prevention system comprises longitudinal ducts distributed over at least a part of the inner surface of the inner face, the upstream end of which receives hot air discharged in the internal space of the air intake through the downstream end of the ducts.

The longitudinal ducts are distributed over the entire transverse annular periphery of the inner face.

The upstream end of the ducts emerges in a transverse chute leading the hot air to the longitudinal ducts.

The chute constitutes the hot air pipe and the generators are fixed onto the outer surface of the chute.

An acoustic panel is superposed on the longitudinal ducts and extends longitudinally from the chute over at least a part of the inner face.

The longitudinal ducts form part of one or more reheating panels over the entire annular transverse periphery of the air intake.

The downstream transverse end of the reheating panel forms a step towards the interior of the air intake so as to house an acoustic panel in the cavity formed by the step and allow the ducts to be able to discharge the hot air in the internal space of the air intake without having to cross the acoustic panel.

Stiffeners are put in place transversely over a part of the inner surface of the outer face, no front frame being provided.

The joint between the inner face and the outer face is produced at the extremum line.

The invention relates also to the nacelle provided with an air intake having at least one or more of the above features.

The invention relates also to the propulsive assembly of an aircraft provided with a nacelle having one or more of the above features.

BRIEF DESCRIPTION OF THE DRAWINGS

Other aims, features and advantages will emerge from the following description of the invention, a description given purely as a nonlimiting example, with reference to the attached drawings in which.

DETAILED DESCRIPTION OF THE PREFERRED EMBODIMENTS

Figure 2:
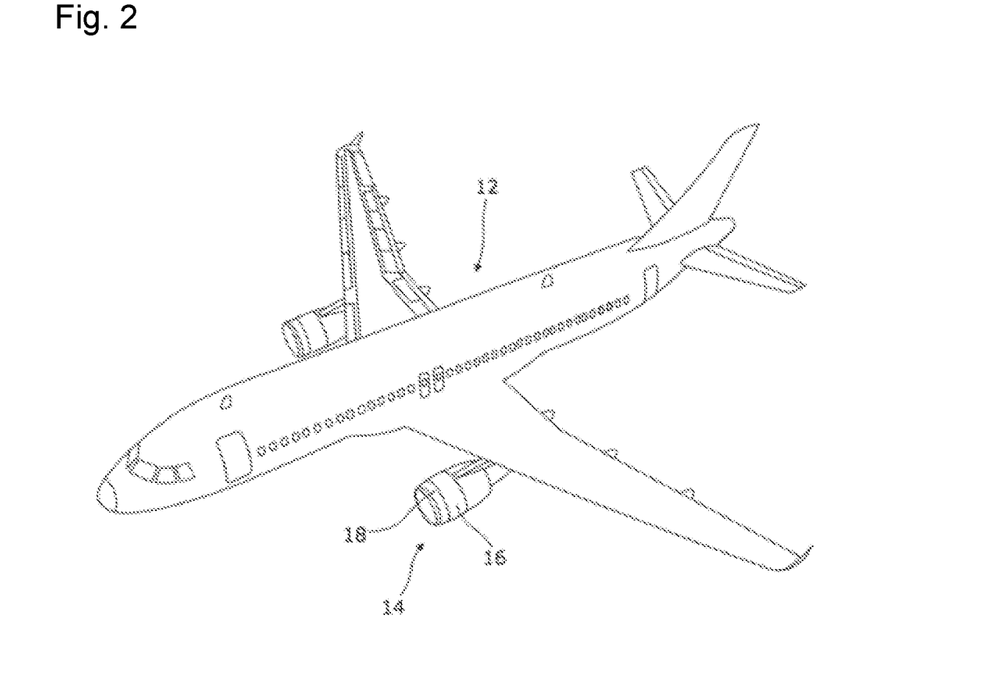
FIG. 2 is a perspective view of an aircraft provided with a propulsive assembly provided with a nacelle according to the present invention.
Figure 3:
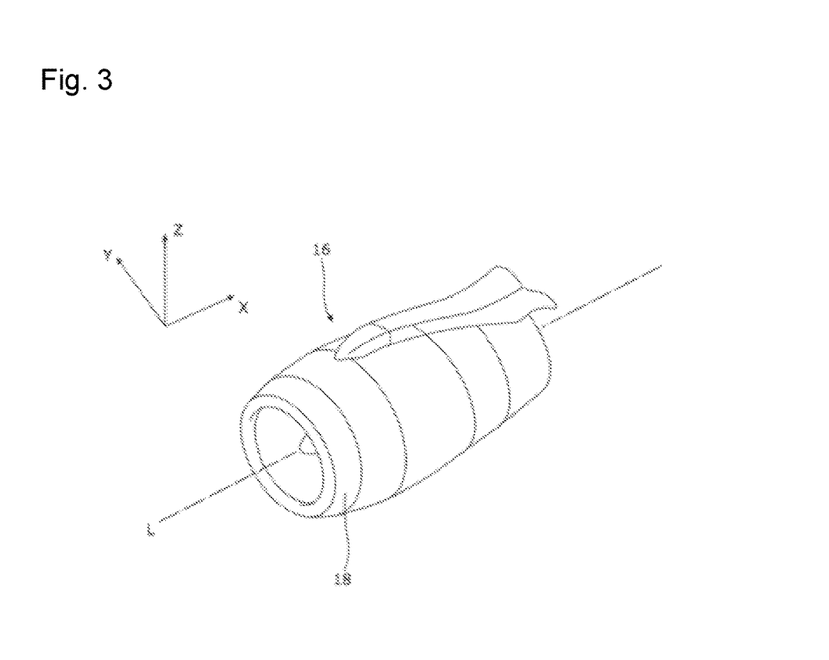
FIG. 3 is a perspective view of a nacelle according to the present invention.

FIG. 2 represents an aircraft 12 comprising a propulsive assembly 14. The propulsive assembly 14 is a device making it possible to generate a thrust which constitutes the propelling force of the aircraft 12. The propulsive assembly 14 comprises a nacelle 16 surrounding an engine such as a jet engine having an air intake 18. As illustrated in FIG. 3, the nacelle 16 extends around an axis called longitudinal axis L oriented in a longitudinal direction X. The direction Y corresponds to the direction oriented transversely with respect to the nacelle 16. The direction Z corresponds to the vertical or height wise direction when the aircraft is resting on the ground. The three directions X, Y and Z are mutually orthogonal. Hereinafter in the description, the terms "front" and "rear", "upstream" and "downstream" are understood according to the direction of the air stream in the propulsive assembly in operation, i.e., the direction X. The air enters through the front of the propulsive assembly, that is to say through the air intake 18 of the nacelle, and emerges through the rear thereof.

Figure 4:
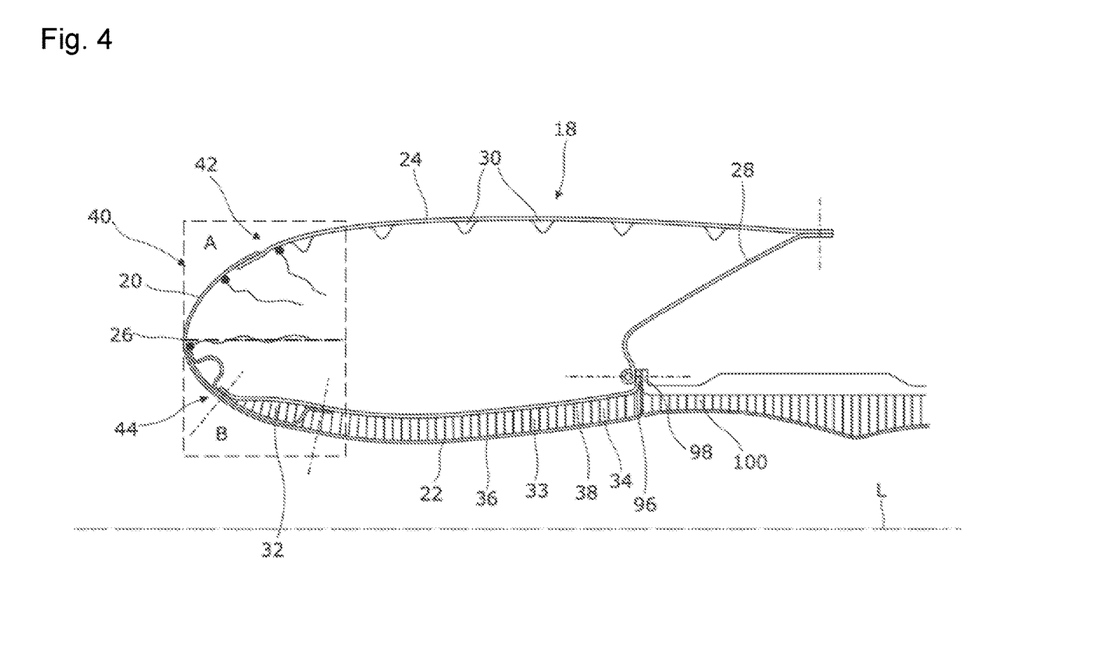
FIG. 4 is a longitudinal cross-sectional view of a nacelle air intake provided with a mixed ice protection system according to the present invention.

As represented in FIG. 4, the air intake 18 comprises an air intake lip 20. The lip 20 is a physical part which defines the leading edge of the fairing of the nacelle. According to the embodiments, the lip 20 can be formed by a part made of a single piece or by several assembled parts. The nacelle comprises an inner annular face 22 and an outer annular face 24. The inner face 22 delimits an internal duct allowing the air to be channeled towards the engine. The outer face 24 constitutes a face in contact with the outside air. The two faces 22 and 24 meet at an annular line 26 positioned at the longitudinally extreme, called extremum line: the extremum line forms the line at the free end of the nacelle in the longitudinal direction at which the tangent to the curvature is vertical. When the propulsive assembly is horizontal in flight, when the air arrives on the leading edge of the nacelle, if it arrives on the side of the inner face 22 with respect to the extremum line 26, it will tend to be directed towards the interior of the nacelle. If it arrives on the side of the outer face, it is directed towards the outside of the nacelle.

Figure 10:
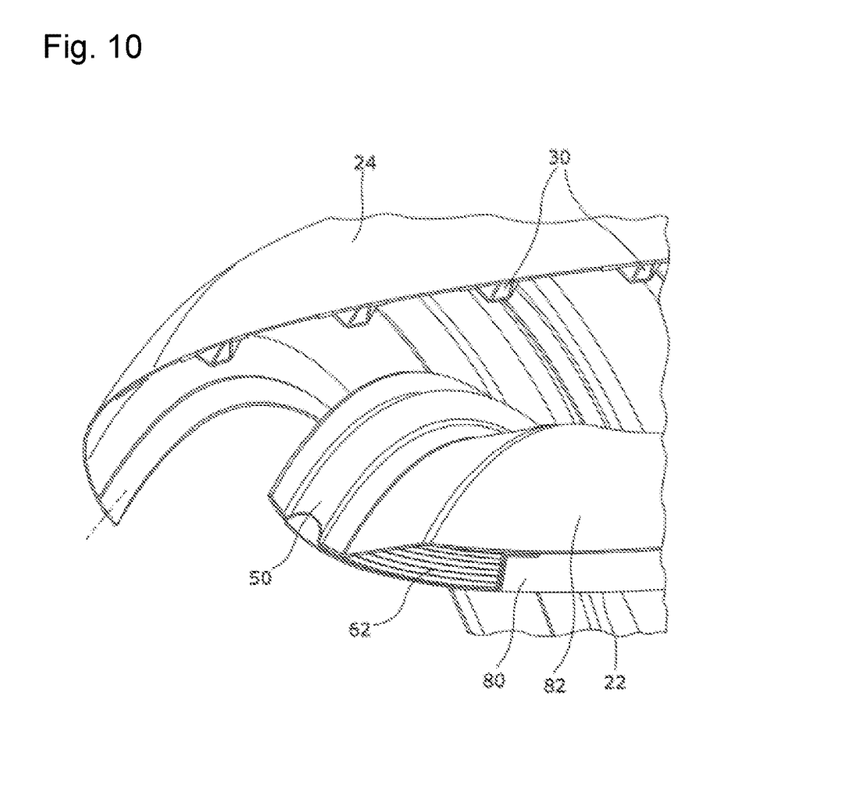
FIG. 10 is an exploded longitudinal cross-sectional and perspective view of the air intake.

According to the embodiment illustrated in FIGS. 4 and 10, the outer face 24 is monolithic, namely formed by a single block; it is not produced by the assembly of at least two parts. Because of this, it offers an outer laminar surface limiting the drag and therefore the consumption, as well as the pollution of the engines. The outer face 24 can be produced in several ways. According to a first example, at least a part of the outer face 24 is produced from a metal panel, for example made of titanium, embedded in a composite structure with thermosetting or thermoplastic matrix. According to a second example, the outer face is produced wholly by a sheet, for example of aluminum. Other embodiments can be envisaged in which the outer face would be formed by the assembly of multiple parts.

The air intake 18 has a U-shaped longitudinal section that is open towards the rear in the longitudinal direction X. The air intake 18 comprises a rear frame 28 which delimits the air intake with respect to the longitudinally next section of the nacelle. The rear frame 28 has a significant inclination with respect to the axis L towards the rear so as to outwardly deflect a bird which, after collision with the air intake, would have penetrated therein; the frame 28 makes it possible to prevent it continuing its trajectory towards the fan zone of the engine. The air intake has no front frame in order to make it possible to prolong the acoustic panel closer to the extremum line 26. Because of this, in the absence of front frame, stiffeners 30 are fixed to the inner surface of the transversely outer face 24. In the embodiment illustrated, they are distributed on its slightest curvature from the rear frame 28 to the ice protection system as will be seen later. In the case of an outer face 24 made by the juxtaposition of a metal panel and a composite structure, the stiffeners are produced from the same composite. They are fixed to the outer face by any known means. The stiffeners can, for example, be incorporated in the structure of the outer face in the case of a co-firing of composite to be polymerized. In the case of an outer face made of sheet steel, the stiffeners are fixed to it by bonding, countersunk rivets or any other type of fixing. The stiffeners can be made of any other material and fixed by any type of means to the outer face 24. The absence of front frame makes it possible to offer an outer face form that has good natural laminar flow performance levels. In fact, it avoids the use of fixings to join the front frame to the outer face. The absence of frame also eliminates any deformation in flight due to the links with the outer face. In the case of a bird impact, the front frame also had the function of deflecting the trajectory thereof: in the present invention, it is the rear frame which serves this purpose. Finally, an additional function of the front frame is to create a cavity with the lip to contain and allow the circulation of hot air. How the circulation of hot air is generated here will be seen later.

In order to limit the noise emitted by the propulsive assembly, the inner face 22 of the nacelle comprises an acoustic panel 33 comprising at least one cellular structure 34 composed of cells or pocket recesses sandwiched between an inner skin 36 oriented towards the axis L and an outer skin 38 oriented in the opposite direction towards the outside of the nacelle. The inner skin 36, commonly called resistive skin, is porous, and for example perforated, to allow the soundwaves to be propagated inside the cellular structure to be attenuated therein. The outer skin 38 is, conventionally, solid but can be perforated. The panel can comprise several layers of cellular structures one on top of the other between which are inserted one or more skins. The structure of the acoustic panel is known from the prior art and will not therefore be described in more detail.

The present invention relates to a mixed system 40 for protecting the air intake of the nacelle against ice. Throughout the following description, the term ice equally covers ice and frost, of all kinds, of all structures and of all thicknesses. In the present invention, the overall system 40 is to be mixed because different protection systems are implemented on the inner face 22 and on the outer face 24 of the air intake. Over at least a part of the outer face 24, there is installed a system 42 for eliminating the formed ice by vibration, while on at least a part of the inner face 22, a system 44 that makes it possible to avoid the formation of ice using a hot fluid is put in place. According to one embodiment, the formed ice elimination system 42 is not installed on the inner face. In this way, if ice were formed on the outer surface of the inner face, by pulverizing it, the broken pieces could be driven into the fan channel and ingested by the engine. However, it is also possible for the formed ice elimination system to be installed beyond the extremum line on the inner face. According to a particular embodiment, it is installed over a small part of the length (longitudinally) of the inner face, i.e., less than 40% of the length of the inner face beyond the extremum line, even less than 20%, even less than 10%. According to one embodiment, the system making it possible to avoid the formation of ice provided on the inner face is installed only on the inner face. However, it is possible for the system making it possible to avoid the formation of ice provided on the inner face to be installed also beyond the extremum line 26 on a part of the outer face. According to one embodiment, either an ice elimination system or an ice formation prevention system is installed on the inner face and the outer face. A marking line can mark the boundary between the two systems. According to one embodiment, the marking line corresponds to the upstream end of the acoustic panel 32 incorporating the ice formation prevention system. If the ice formation prevention system intended for the acoustic panel or a part thereof extends further upstream beyond the acoustic panel, the end of the acoustic panel incorporating the ice formation prevention system corresponds to the upstream end 31 of the ice formation prevention system. This means that, on the side where there is no acoustic panel, there is provided only a formed ice elimination system and on the side of the acoustic panel (and according to certain embodiments beyond, if the prevention system associated with the panel extends beyond the latter) there is provided only an ice formation prevention system using a hot fluid. If the marking line corresponds to the extremum line, the embodiment corresponds to the installation of an ice elimination system on the outer face and an ice formation prevention system on the inner face. According to a particular embodiment, the marking line is located beyond the extremum line on the inner face.

Figure 5:
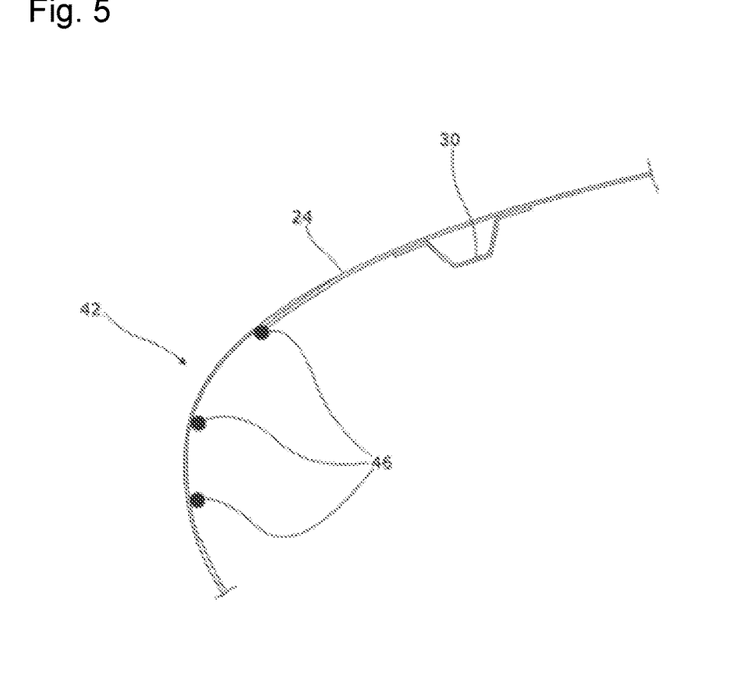
FIG. 5 is a partial and enlarged view of the zone A of the air intake of FIG. 4 provided with a formed ice elimination system according to the present invention.

As represented in FIG. 5, the ice elimination system 42 destroys the ice once formed which is discharged with the flow of air along the outer surface of the outer face 24. It comprises electromechanical devices 46 of piezoelectric type that are independent and placed on at least a part of the inner surface of the outer face 24 of the air intake. The devices 46 are fixed to the inner surface of the outer face 24 by bonding or epoxy resin or even by titanium rivet fixings or even by any other type of fixing. In the form illustrated, they are distributed at a certain distance from one another. The number and the location of the devices 46 depend on their performance levels and on the air intake defrosting demands. It is possible for devices 46 to be positioned on the side of the inner face with respect to the extremum line 26 but not beyond the system 44. This type of device requires only a very low level of electricity to operate. They can be powered in various ways and, for example, by the aircraft and more specifically its electrical core, via independent cables leading to a source of electricity or even by thermoelectric generators, the disposition of which in the air intake will be described later. According to one possible embodiment, a source of electricity could be photovoltaic modules positioned on the outer surface of the nacelle and, in particular, the top surface most exposed to solar radiation. The generators can be, for example, generators based on semiconductor material. The semiconductor materials produce electrical energy under the influence of a temperature difference. The semiconductor-based thermoelectric generators are placed on a hot surface and, for example, on the surface of a pipe conveying hot air such as a pipe supplying, for example, the air intake with hot air or even on the surface of a hot air distribution chute linked with the pipe which will be described later. Thus, the piezoelectric devices are autonomous: they are supplied with electricity by thermoelectricity from the temperature difference between the interior of the air intake and a hot surface inside the air intake on which the devices 46 are placed. Each of these devices 46 produces vibrations which break the ice once formed. The broken pieces of ice, when detached from the outer face, are driven by the air flow towards the outside of the nacelle. To allow the propagation of the vibrations, it is preferable for the outer face not to be composed of the juxtaposition of multiple panels. It is therefore preferable for there not to be an acoustic panel.

Figure 6:
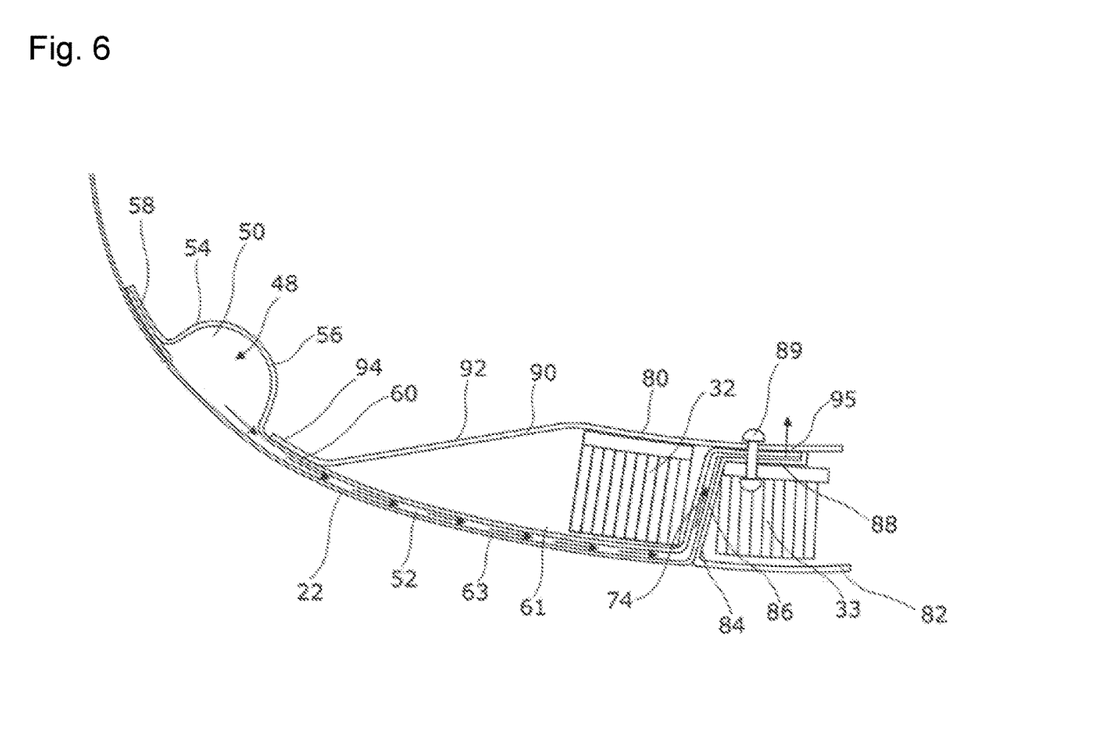
FIG. 6 is a partial and enlarged view of the zone B of the air intake of FIG. 4 provided with an ice prevention system according to the present invention.

The ice formation prevention system 44 uses hot air 48 taken, for example, at the engine to at least partially reheat the inner face 22. The hot air 48, as represented by arrows in FIG. 6, is introduced into a chute 50 fixed transversely onto the inner surface of the inner face 22 over its entire periphery. The chute 50 is a part that makes it possible to contain the hot air like the front frame did in combination with the lip. According to an embodiment illustrated in FIG. 7, in the same way as in the prior art described above, the hot air is channeled by a pipe 49 taking the hot air from the engine. However, the fluid and, here, the hot air could come from any other source such as an air heating device. The pipe 49 takes the hot air from the engine from one of its ends and supplies the chute by the other of its ends. The pipe 49 can be made of stainless steel or Inconel or any other material. In the embodiment illustrated, it is formed by a double skin and its end is tightly linked to the chute 50. The thermoelectric generators 51 are fixed onto the outer surface of the chute 50, namely the surface oriented towards the interior of the air intake. During defrosting, the hot air passes inside the chute 50: the hot air stream which is given off from the chute is used by the generators 51 to create electricity autonomously. Because of the very high temperature of the hot air which circulates in the chute, the generator profits from a temperature difference that can vary between 300° C. and 450° C. between the surface of the chute and the cold environment of the air intake. The generator 51 can thus produce power that is sufficient for the ice protection needs of the air intake and much lower than the power required for conventional electrical defrosting systems. Relatively short electrical leads 53 make it possible to connect the generators 51 to the devices 46. As soon as the defrosting is started up, the hot air circulates in the chute 50 and allows the generator to supply the piezoelectric devices 51, offering a simple, autonomous and redundant system through the provision of multiple generators on the chute. It is no longer necessary to make use of long and expensive electrical leads linked with the electrical core of the aircraft or other systems inside the aircraft. The chute 50 is connected with longitudinal ducts 52 distributed over the inner surface of the inner face 22 in order to heat it up and prevent the formation of ice. The chute 50 forms a line of partially annular section that makes it possible to guide the hot air from the pipe 49 along at least a part of the inner face 22 of the air intake over the entire transverse periphery thereof. It guides the hot air to the ducts 52. The chute 50 is, in the embodiment, outside of the acoustic panel, but any other embodiment is possible and the chute could be incorporated in the panel. It forms part of the ice formation prevention system intended for the acoustic panel and, in the embodiment, it extends further beyond the latter. In this case, as seen above, the marking line is formed by the end 31 of the ice formation prevention system here formed by the end 31 of the chute. In the embodiment illustrated in FIGS. 6 and 8, the chute 50 comprises an annular plate 54 of omega Ω section, with an arched web 56 and two feet 58, 60 on either side of the web, an upstream foot 58 and a downstream foot 60. The plate 54 is made of titanium, for example. The chute 50, by virtue of its omega-shaped transverse annular stiffener form, contributes to bird retention making it possible to attenuate the energy received in the event of impact. No device 46 is fixed to the inner face 22 from the end of the chute, or more specifically from the end of the foot 58 of the chute.

In the embodiment illustrated, the longitudinal ducts 52 form part of one and the same panel 62, hereinafter called reheating panel to distinguish it from the acoustic panel 32. The reheating panel 62 comprises a first sheet and a second sheet made of titanium, for example. To obtain the ducts 52, the first sheet 61 is shaped by any known forming technique to form notches which, when pressed against a second sheet 63 of levelled surface, form the ducts 52. The notches can have any type of section, partially annular, partially rectangular or the like. The two sheets 61 and 63 are juxtaposed on one another and fastened against one another. The joint between the two sheets is produced, for example, by conventional welding or by eutectic bonding depending on the materials of the sheets, by brazing or any other known type of fixing. The second sheet 63 forms a part of the inner face 22. The cellular structure 34 of the acoustic panel 32 (FIG. 4) rests on the reheating panel 62 which serves as inner skin of the acoustic panel 32. The first and second sheets 61 and 63 of the panel 32 serving as inner skin are perforated between the ducts 52 to allow the acoustic waves to penetrate into the cellular structure as a Helmholtz resonator. Holes 65 (by definition, through-holes) are produced in the first and second sheets 61 and 63. According to one possible embodiment, the holes are circular with a diameter of between 0.2 and 0.6 millimeters or in any other possible form, oblong in which the greatest dimension from one edge to the other is 5 mm and the smallest is 0.5. The cellular structure 34 is deformed and encloses the longitudinal ducts 52. Thus, the hot air 48 which circulates from the chute 50 in the ducts makes it possible to prevent the formation of ice on the inner face 22 formed by the second sheet of the reheating panel; because of the absence of front frame, and the presence of the reheating panel 62, the acoustic panel 32 can be brought closer to the open end of the air intake compared to the known configurations. By virtue of being able to extend over a greater surface, the acoustic function is enhanced.

Figure 7:
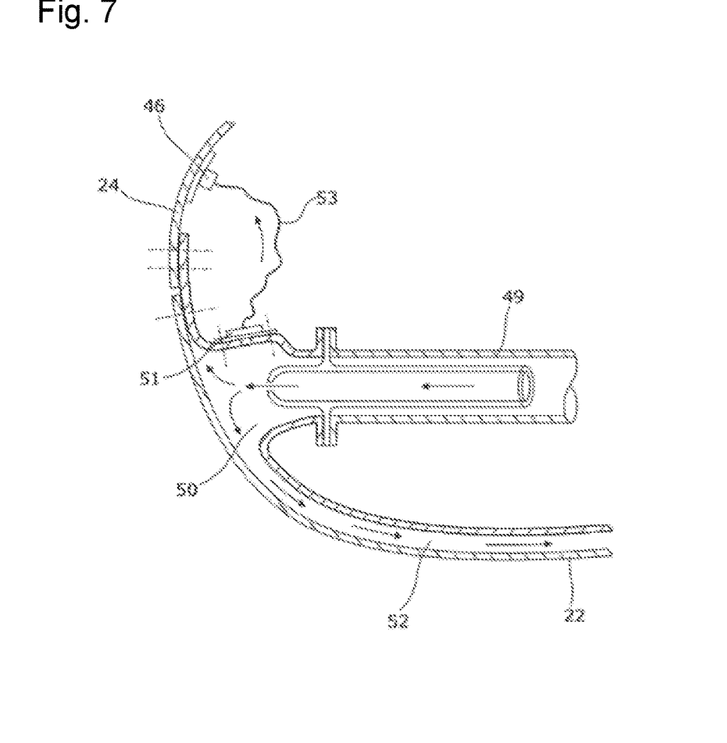
FIG. 7 is a partial and enlarged longitudinal cross-sectional view, at a hot air supply pipe, of a nacelle air intake provided with a mixed ice protection system according to the present invention.
Figure 8:
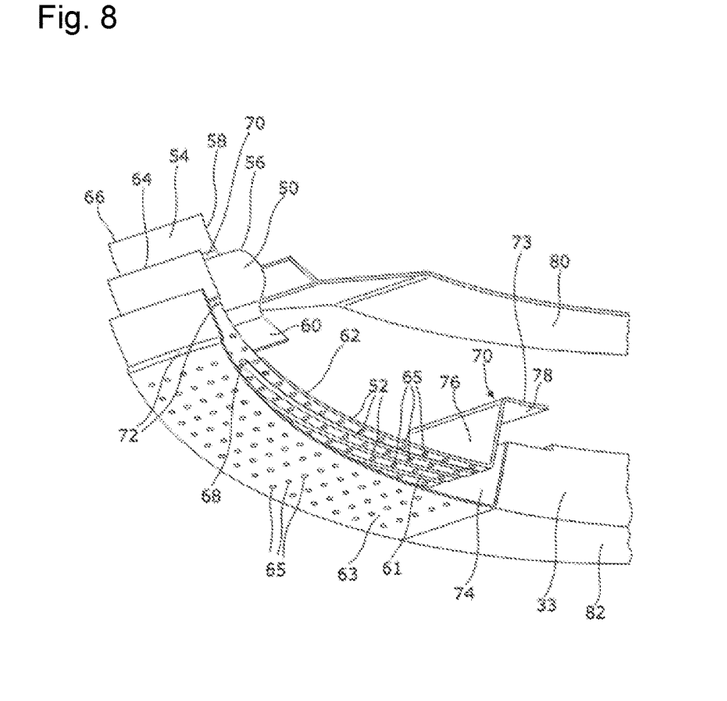
FIG. 8 is an exploded longitudinal cross-sectional and perspective view of the different parts of the air intake at the zone B.
Figure 9:
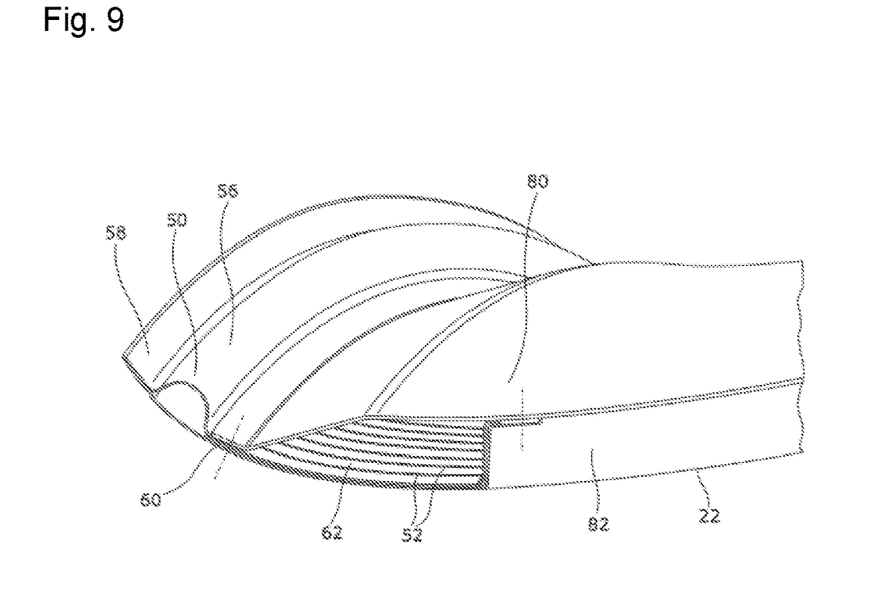
FIG. 9 is a longitudinal cross-sectional and perspective view of the air intake at the zone B.

The reheating panel 62 more specifically takes the form of two preformed rectangular strips juxtaposed one on top of the other and attached one against the other; several reheating panels 62 in strip form are juxtaposed transversely to extend over the entire periphery of the outer annular face 24. The panels 62 are linked to one another by screwing, bolting, clipping or any other known type of means. Several embodiments are possible to connect the ducts 52 with the chute 50. In the embodiment illustrated, the reheating panel 62 extends longitudinally under the chute 50. The transverse upstream edge 64 of the reheating panel 62 comes level with the free transverse edge 66 of the upstream foot 58 of the chute. The plate 54 is fixed to the inner surface of the reheating panel 62 by its feet 58, 60 by bonding, welding, screwing, bolting or any other fixing means. When the omega-shaped plate 54 is fixed to the reheating panel, the latter blocks the web 56 of the chute to form the line described above. The end 68 of the longitudinal ducts 52 emerges in the web 56 of the plate of the chute. The reheating panel 62 has, in line with the transverse end 70 of the upstream foot 58 linked to the web, an upstream ledge 72 in the form of a step towards the interior of the air intake and whose height is slightly greater than the thickness of the outer face 24. Thus, the outer face 24 can be housed inside the cavity formed by the ledge 72 and be juxtaposed against the step formed by the ledge. The outer surface of the outer face 24 thus comes flush with the outer surface of the second sheet 63 of the reheating panel forming the inner face 22. The outer face 24, the reheating panel 62 and the upstream foot 58 of the plate of the chute are fixed together by any type of means and, for example, by bolts. FIG. 7 represents another form of assembly between the face 24 and the panel 62. The face 24 and the panel 62 are juxtaposed, attached contiguously to one another. The foot 58 of the chute is superposed on the face 24 and on the panel 62 and is fixed to the latter by any type of means, such as by bolting, the axes of which are represented in FIG. 7, namely, at least one between the foot 58 and the outer face 24 on one side of the line 26 and at least one other between the foot 58 and the inner face 22 on the other side of the line 26. According to one embodiment, the joint between the inner face 22 and the outer face 24 is produced at the extremum line 26 to enhance the laminar flow performance of the air intake a little more.

The downstream transverse end 73 of the reheating panel 62 has a downstream ledge 74 in the form of a step towards the interior of the air intake, the height of which is slightly greater than the thickness of an acoustic panel 33. In this way, the step forms a housing inside which the acoustic panel 33 is housed. That also allows the longitudinal ducts 52 to be able to discharge the hot air inside the air intake without having to pass through the cellular structure of an acoustic panel. In this embodiment, the hot air is discharged inside the air intake but it could be discharged elsewhere. The sheets 61, 63 of the reheating panel are folded to form a transverse portion 76 and folded again to form a longitudinal portion 78. Two closure panels 80, 82, an inner panel 80 and an outer panel 82, are affixed on either side of the acoustic panel 33. The outer closure panel 82 forms the outer face 24 of the air intake in continuity with the second sheet 63 of the reheating panel. The outer surface of the outer closure panel 82 comes flush with the outer surface of the reheating panel 62. In this way, a surface continuity is ensured between the outer closure panel 82 and the reheating panel 62. The outer closure panel 82 comprises, upstream, a return 84 to enclose the edge of the acoustic panel 33. The return 84 comprises a transverse first face 86 attached against the first portion 76 of the downstream ledge 74 of the reheating panel, and a longitudinal second face 88 attached against the second portion 78 of the downstream ledge 74. The free end of the longitudinal second face 88 comes in line with the free end of the second portion 78 of the ledge. The inner closure panel 80 is affixed against the longitudinal second portion 78 of the downstream ledge 74, the acoustic panel 32 and the acoustic panel 33. The second portion 78 of the ledge is sandwiched between the second face 88 of the return 84 and the second inner closure panel 80. The joint between the second portion 78 of the ledge of the panel 62, the second face 88 of the panel 82 and the inner closure panel 80 is produced by any type of fixing, and, for example, blind bolts 89 represented in FIG. 6. The inner closure panel 80 is prolonged towards the chute 50 and comprises an upstream end 90 that comes to be attached against the reheating panel. The upstream end 90 comprises an inclined intermediate part 92 and a lug 94 fixed to the reheating panel by any known type of means and, for example, by bonding. The free end of the lug 94 is, in the embodiment, affixed onto the reheating panel 62 against the web 56 of the chute. The acoustic panel 32 can be introduced or not between the reheating panel 62 and the inner closure panel 80. This zone, whether solid or hollow, offers a dual function making it possible both to absorb the acoustic waves and to prevent the formation of ice. In the case of the presence of an acoustic panel, the cellular structure 34 of the acoustic panel 32 is linked to the inner panel 80 and/or to the reheating panel 62 by bonding or by any other known type of means such as an adhesive provided on the structure. The inner closure panel 80 has apertures. It can, for example, be porous. Thus, the hot air emerging at the downstream end 95 of the longitudinal ducts 52 can pass through the closure panel and be discharged into the air intake.

Figure 11:
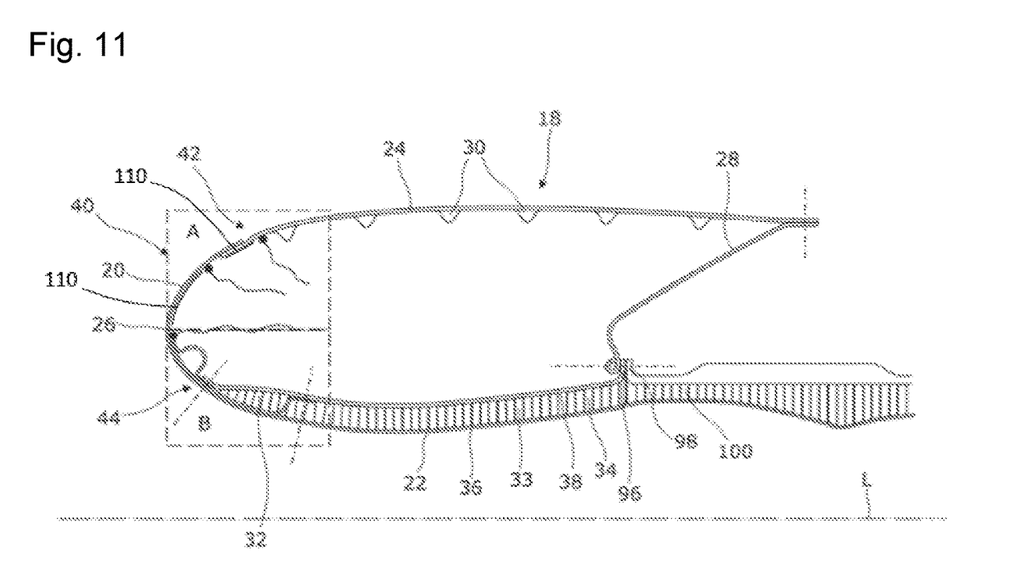
FIG. 11 is a longitudinal cross-sectional view of a nacelle air intake provided with a mixed ice protection system according to the present invention in which the ice elimination system is combined with an ice formation prevention system that does not use hot fluid.
Figure 12:
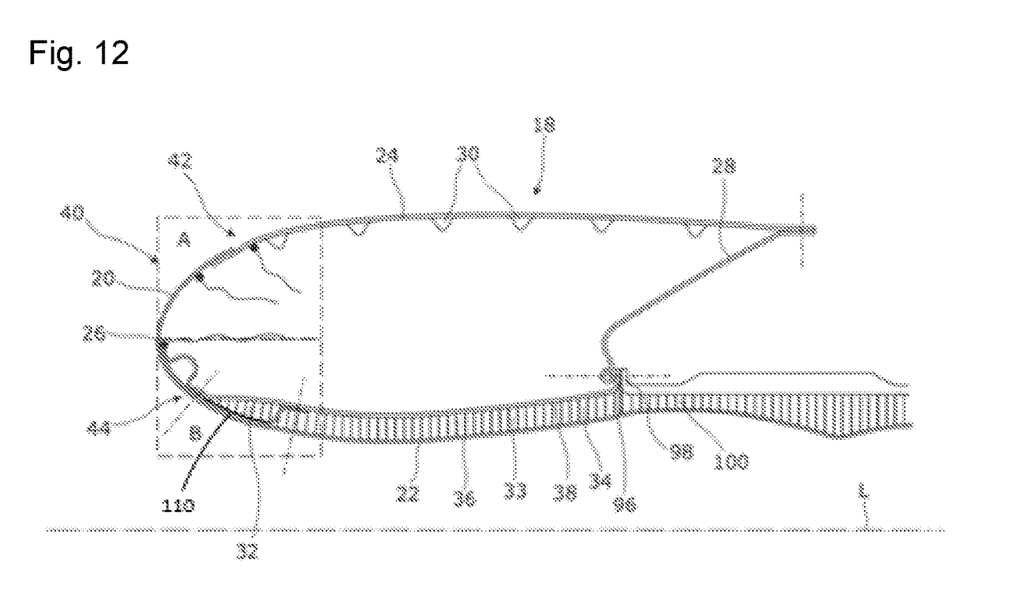
FIG. 12 is a longitudinal cross-sectional view of a nacelle air intake provided with a mixed ice protection system according to the present invention in which the ice formation prevention system using a hot fluid is combined with an ice formation prevention system that does not use hot fluid.
Figure 13:
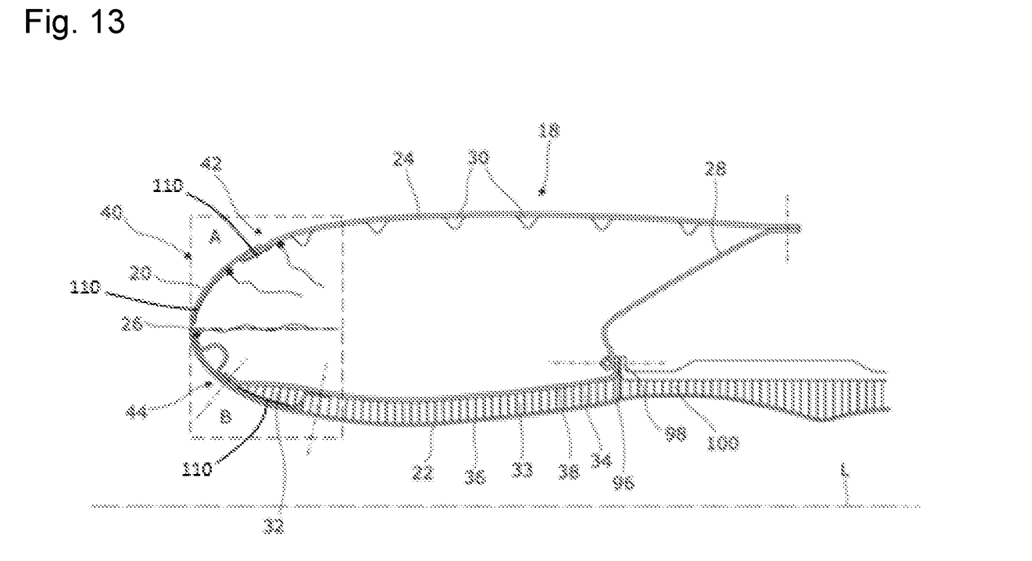
FIG. 13 is a longitudinal cross-sectional view of a nacelle air intake provided with a mixed ice protection system according to the present invention in which the ice elimination system and the ice formation prevention system using a hot fluid are combined with an ice formation prevention system that does not use hot fluid.

According to the embodiment illustrated in FIG. 4, the downstream end of the inner closure panel 80 comprises an annular flange 96 allowing it to be secured with the next section which is also provided with a flanged part 98. The flanges 96, 98 are fixed to one another, for example by bolts. The end of the rear frame 28 is superposed on the two flanges 96, 98 for a common fixing by bolts. The link between the acoustic panel 32 and the acoustic panel 100 of the next section can be produced in multiple known ways, for example using a link part, and will not be described in more detail. It is possible to combine, with the ice elimination system and/or the ice formation prevention system using a hot fluid, another ice formation prevention system that does not use a hot fluid, such as insulated heating electrical resistors or in heating mat form 110 as in the example illustrated. FIG. 11 shows a combination with the ice elimination system in which a heating mat 110 is inserted between the devices 46. FIG. 12 shows a combination with the ice formation prevention system in which a heating mat is superposed with the acoustic panel 32: in the embodiment illustrated, the mat is located between the inner face 22 and the acoustic panel 32. FIG. 13 shows a combination with both systems.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air intake comprising
an outer face and an inner face meeting at a line at a longitudinally extreme, called extremum line,
an acoustic panel being installed on an inner surface of a part of the inner face,
wherein, an elimination system based on vibration of ice formed is put in place on at least a part of the outer face and an ice formation prevention system using a hot fluid is put in place on at least a part of the inner face, and
wherein, either the ice elimination system or the ice formation prevention system using a hot fluid is installed on the inner face and on the outer face, a marking line marking a boundary between the ice elimination system and the ice formation prevention system.

2. The air intake according to claim 1, wherein the marking line corresponds to an upstream end of the acoustic panel incorporating the ice formation prevention system.

3. The air intake according to claim 2, wherein the formed ice elimination system comprises piezoelectric devices distributed over at least a part of an inner surface of the outer face.

4. The air intake according to claim 3, wherein thermoelectric generators are placed on a hot surface of the air intake and connected to the piezoelectric devices to supply the piezoelectric devices from a temperature difference between the interior of the air intake and the hot surface inside the air intake.

5. The air intake according to claim 1, wherein the ice formation prevention system comprises longitudinal ducts distributed over at least a part of the inner surface of the inner face, an upstream end of the longitudinal ducts receives hot air discharged into an internal space of the air intake through a downstream end of said ducts.

6. The air intake according to claim 5, wherein the longitudinal ducts are distributed over an entire transverse annular periphery of the inner face.

7. The air intake according to claim 5, wherein the upstream end of the ducts emerges in a transverse chute leading the hot air to the longitudinal ducts.

8. An air intake comprising;
an outer face and an inner face meeting at a line at a longitudinally extreme, called extremum line,
an acoustic panel being installed on an inner surface of a part of the inner face,
wherein, an elimination system based on vibration of ice formed is put in place on at least a part of the outer face and an ice formation prevention system using a hot fluid is put in place on at least a part of the inner face, and
wherein, either the ice elimination system or the ice formation prevention system using a hot fluid is installed on the inner face and on the outer face, a marking line marking a boundary between the ice elimination system and the ice formation prevention system,
wherein the marking line corresponds to an upstream end of the acoustic panel incorporating the ice formation prevention system,
wherein the formed ice elimination system comprises piezoelectric devices distributed over at least a part of an inner surface of the outer face,
wherein thermoelectric generators are placed on a hot surface of the air intake and connected to the piezoelectric devices to supply the piezoelectric devices from a temperature difference between the interior of the air intake and the hot surface inside the air intake,
wherein the ice formation prevention system comprises longitudinal ducts distributed over at least a part of the inner surface of the inner face, an upstream end of the longitudinal ducts receives hot air discharged into an internal space of the air intake through a downstream end of said ducts,
wherein the upstream end of the ducts emerges in a transverse chute leading the hot air to the longitudinal ducts, and
wherein a surface of the chute constitutes the hot surface and the generators are fixed onto an outer surface of the chute.

9. The air intake according to claim 7, wherein an acoustic panel is superposed on the longitudinal ducts and extends longitudinally from the chute over at least a part of the inner face.

10. The air intake according to claim 5, wherein the longitudinal ducts form part of one or more reheating panels over an entire annular transverse periphery of the air intake.

11. The air intake according to claim 10, wherein the downstream transverse end of the reheating panel forms a step towards the interior of the air intake to house an acoustic panel in a cavity formed by the step and allow the ducts to be able to discharge the hot air in an internal space of the air intake without having to cross said acoustic panel.

12. The air intake according to claim 1, wherein an ice formation prevention system that does not use a hot fluid is combined with at least one of the ice elimination system or with the ice formation prevention system using a hot fluid.

13. A nacelle provided with an air intake according to claim 1.

14. A propulsive assembly of an aircraft provided with a nacelle according to claim 13.

* * * * *